Patented Jan. 22, 1952

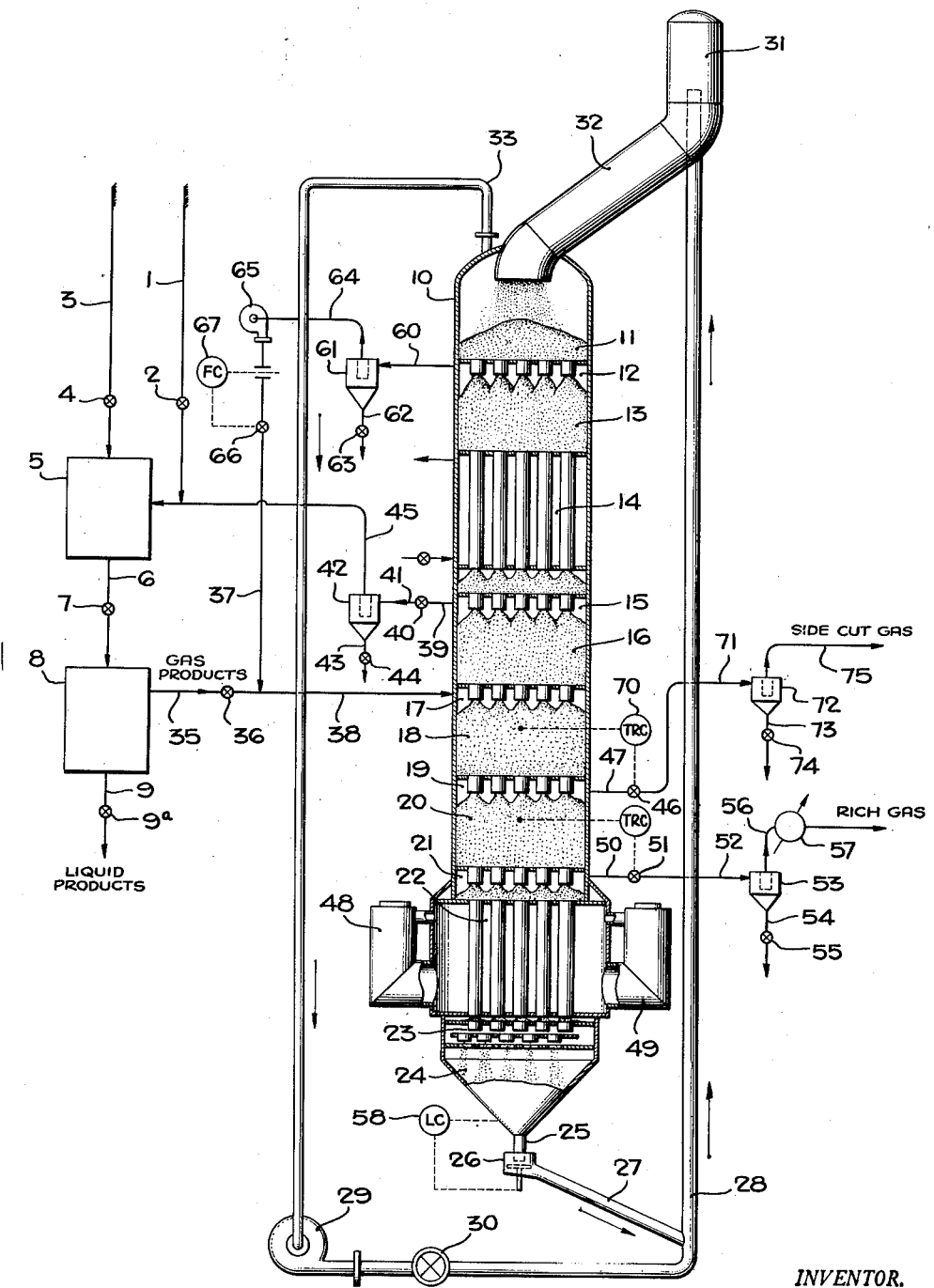

2,583,352

UNITED STATES PATENT OFFICE 2,583,352

ADSORPTION PROCESS

Clyde H. O. Berg, Long Beach, Calif., assignor to Union Oil Company of California, Los Angeles, Calif., a corporation of California Application June 19, 1947, Serial No. 755,753

16 Claims. (Cl. 183—4.2)

This invention relates to a process and apparatus for the continuous separation of gaseous mixtures on solid granular adsorbents by selective adsorption and is particularly directed to the separation of hydrogen halides from low molecular weight hydrocarbons.

Conventional means for effecting the separation of the component parts of gaseous mixtures include fractional distillation, solvent extraction, oil absorption, selective adsorption and other processes. In order to effect separations using fractional distillation the gaseous mixture to be treated must first be liquefied by the application of pressure or a reduction in temperature, or both. Difficulties are encountered in applying these processes alone where the gaseous mixture to be treated contains constituents possessing low critical temperatures requiring abnormally low temperatures to cause liquefaction, and oftentimes the use of these methods is impracticable from either operation or economic standpoints.

Solvent extraction may be applied to the separation of gaseous mixtures and also, by the very nature of the process, requires the preliminary liquefaction of the gaseous mixture to be separated. As in the application of fractional distillation and depending upon the properties of the particular gaseous mixture, such liquefaction may require excessively elevated pressures and perhaps abnormally low temperatures.

I have previously proposed a method for the separation of gaseous mixtures containing constituents which are difficultly liquefiable because of low critical temperatures and constituents which are not readily soluble in commonly used solvents. Such gaseous mixtures may be conveniently and economically separated at moderate temperatures and pressures by this method which involves the application of selective adsorption and desorption.

In general, my previously proposed process of separating gaseous mixtures by continuous selective adsorption on a granular solid adsorbent involves the steps of countercurrently contacting the gaseous mixture with a moving bed of the adsorbent, thereby adsorbing from the mixture those constituents which are more readily adsorbable and leaving as a substantially unadsorbed gas those constituents which are less readily adsorbable. In a moving bed operation, the adsorbent upon which certain of the gaseous constituents have been adsorbed flows from an adsorption zone into a stripping or desorption zone wherein the adsorbent is heated and contacted with a stripping gas, such as steam, for example, to cause the adsorbed constituents to be liberated. The adsorbent, freed of adsorbed constituents, is subsequently cooled prior to repassage through the adsorption zone. In this proposed process of selective adsorption a gaseous mixture may be divided into two separate fractions consisting of a rich gas containing the more readily adsorbable constituents having the higher molecular weight or critical temperature and a lean gas containing the less readily adsorbable constituents having the lower molecular weight or critical temperature. The rich gas is obtained by adsorption and subsequent desorption of the more readily adsorbable constituents and the lean gas is obtained by removal from the adsorption zone of the less readily adsorbable constituents as a substantially unadsorbed gas.

In a recently proposed improvement in the art of separation of gaseous mixtures by selective adsorption, an adsorption column has been provided which contains two or more rectification zones which permits the separation of the gaseous mixtures into more than two fractions. Such operations are made possible by the utilization of a refluxing step within these rectification zones permitting production not only of the lean and rich gases cited above, but also one or more intermediate fractions containing constituents which are of intermediate adsorbability.

It is of general utility to employ a stripping gas in the desorption zone of the selective adsorption apparatus to facilitate complete desorption from the adsorbent of the more readily adsorbable constituents present. In most cases it is advantageous to employ steam as the stripping agent. Steam, when in contact with certain solid granular adsorbents, has different adsorption characteristics from other light gases which are easily separable by the selective adsorption process. Whereas, most of these gases are adsorbable to at least a small degree over a wide range of temperature, steam is highly adsorbed at one temperature and is virtually completely desorbed at a temperature 100° F. to 200° F. higher. The actual values of these temperatures vary with pressure and with the particular adsorbent. These adsorption characteristics of steam in the presence of granular adsorbents offer many advantages for use as a stripping gas, the principal advantage being that steam is, under operation pressures and temperatures, more readily adsorbable than the more readily adsorbable constituents of the gaseous mixture to be separated. Furthermore, by heating the granular adsorbent it is possible to remove nearly completely the adsorbed stripping steam.

The process of selective adsorption is likewise applicable to mixtures of gases which contain constituents which are corrosive or highly reactive in the presence of water vapor or very soluble in liquid water. As an example of this may be cited the separation of hydrogen chloride from methane in the presence of a solid granular adsorbent by the process of selective adsorption. The use of steam as a stripping gas for this and similar separations is precluded for several reasons. The first of these may be given as the extreme corrosiveness of wet hydrogen chloride on conventional materials of construction such as mild steel. The second of these reasons is the extremely high solubility of hydrogen chloride in water which, with steam used as a stripping gas, necessitates the inclusion in the adsorption process of a supplementary fractionation operation to permit the separation of hydrogen chloride from the condensed stripping steam.

Gaseous mixtures containing hydrogen chloride and low molecular weight hydrocarbons are produced in relatively large quantities in chemical processes involving the chlorination of hydrocarbons for the production of chlorinated solvents, refrigerants, anesthetics, and synthetic organic chemicals. The process of selective adsorption is an efficient and easily controlled process for separating hydrogen chloride as a byproduct from low molecular weight hydrocarbon reactants present in such gaseous mixtures.

It is an object of the present invention to provide an improved selective adsorption process for the continuous separation of gaseous mixtures of low molecular weight hydrocarbon gases or other organic compounds and constituents which preclude the use of steam as a stripping agent.

It is a further object to provide an improvement in the selective adsorption process which permits efficient separation of gaseous mixtures without the use of steam as a stripping gas.

It is an additional object of my invention to provide an improved selective adsorption process which permits the separation of gaseous mixtures which comprise low molecular weight hydrocarbons and a hydrogen halide.

It is a more particular object of my invention to provide an improvement in the selective adsorption process to permit the separation of gaseous mixtures containing hydrogen chloride and methane.

It is a correlated object of my invention to provide an improved apparatus to accomplish the above-mentioned objects.

Other objects and advantages of my invention will become apparent to those skilled in the art as the description thereof proceeds.

Briefly, my invention comprises an improved process and apparatus for the separation of gaseous mixtures by selective adsorption on solid granular adsorbents. My invention is particularly directed to the separation of normally gaseous mixtures containing individual constituents which react with water vapor, form corrosive mixtures with water vapor, are highly soluble in water, or for other reasons should be maintained in an anhydrous condition. My invention more particularly comprises an improved process and apparatus for the separation of gaseous mixtures containing hydrogen chloride and low molecular weight hydrocarbons having less than about 4 carbon atoms per molecule. Such mixtures containing those constituents are produced in hydrocarbon chlorination processes in the manufacture of synthetic organic chemicals.

In the improved selective adsorption process, according to my invention, I have found it possible to employ a portion of the lean gas containing less readily adsorbable constituents as a stripping agent in place of steam. By contacting the solid granular adsorbent at an elevated temperature with a portion of the lean gas it is possible to effect a substantially complete removal from the adsorbent of the more readily adsorbable constituents adsorbed on the adsorbent. A recycle gas is thus formed which contains the less readily adsorbable constituents present in the stripping gas together with the more readily adsorbable constituents desorbed from the adsorbent by the stripping gas. Recirculation of this recycle gas to be combined with the feed gas to be separated forms a continuous process for the separation of such gaseous mixtures without the use of stripping steam.

In the improved selective adsorption process of my invention an auxiliary stripping zone is positioned in the upper portion of the selective adsorption column adjacent to and above the cooling zone. Thus, the improved selective adsorption apparatus comprises a cooling zone, an adsorption zone, at least one rectification zone and a heating and adsorption zone, together with the auxiliary stripping zone. With such an apparatus it is possible to effect an efficient and substantially complete separation of a gaseous mixture of hydrogen chloride and methane so as to produce a lean gas containing a high concentration of methane and a rich gas containing a high concentration of hydrogen chloride. By using a portion of the methane in the lean gas as a stripping gas in the auxiliary stripping zone a recycle gas is produced from the auxiliary stripping zone which comprises methane and hydrogen chloride and which may be combined with the feed gas to be separated.

The process and apparatus of my invention may be more clearly understood by reference to the accompanying drawing which illustrates a vertical cross section of the selective adsorption apparatus adapted to carry out the hydrogen chloride-methane separation according to my invention.

In the accompanying drawing the improved selective adsorption process according to my invention is shown operating in conjunction with a process for the chlorination of low molecular weight normally gaseous hydrocarbons. A stream of low molecular weight hydrocarbons such as natural gas or selected streams produced in petroleum refining operations is applicable in the process. For purposes of description this stream will be considered to consist predominantly of methane. The methane is introduced into the process by means of line 1 controlled by valve 2 and is combined with methane flowing through line 45 which is separated from the chlorination product gases. The combined methane stream is introduced into chlorinator 5 wherein it contacts chlorine introduced by means of line 3 and controlled by valve 4. Gaseous and liquid chlorinated products are produced by the reaction taking place in chlorinator 5 which are withdrawn therefrom by means of line 6 controlled by valve 7 and are introduced into separator 8 which may comprise a low temperature fractional distillation column. From separator 8, the liquid chlorinated products are withdrawn by means of line 9 controlled by valve 9a. The gaseous products produced in chlorinator 5 are separated from the liquid chlorination products in separator 8. The gaseous products consist predominantly of hydrogen chloride, which is a product of the chlorination reaction, and unreacted methane. This gaseous mixture of hydrogen chloride and methane is withdrawn from separator 8 by means of line 35 controlled by valve 36 and is introduced into the selective adsorption apparatus which is adapted to accomplish the hydrogen chloride-methane separation as hereinafter more fully described.

Selective adsorption column 10 is provided with hopper 11, recycle gas disengaging zone 12, auxiliary stripping zone 13, cooling zone 14, lean gas disengaging zone 15, adsorption zone 16, feed gas engaging zone 17, primary rectification zone 18, side cut gas disengaging zone 19, secondary rectification zone 20, rich gas disengaging zone 21, adsorbent heating zone 22, adsorbent flow control zone 23, bottom zone 24, sealing leg zone 25, and an adsorbent flow control valve 26. A continuous moving bed of a solid granular adsorbent is passed downwardly by gravity through selective adsorption column 10 and successively through the aforementioned zones positioned within column 10. The adsorbent flows from the bottom of selective adsorption column 10 through adsorbent flow control valve 26 and is introduced into lift line 28 by means of transfer line 27. An adsorbent suspension is formed by mixing the adsorbent with a lift gas. The adsorbent is thereby conveyed upwardly through lift line 28 under pressure exerted by lift line blower 29 controlled by valve 30 and is introduced into impactless separator 31. Herein the adsorbent suspension is broken and the lift gas and the adsorbent flow downwardly by gravity through transfer line 32 for introduction into hopper 11. The lift gas is removed from the upper portion of selective adsorption column 10 by means of lift gas return line 33 connected to the suction inlet lift line blower 29 thus completing a lift gas recycle stream which is employed for conveying the adsorbent removed from the lower portion of the selective adsorption column to the upper portion thereof.

Level control 58 shown in the accompanying figure comprises a receptacle such as a funnel placed within the adsorbent bed and positioned so that the adsorbent flows downwardly through the funnel. The funnel is supported within the moving bed by a suspension arm which is attached at right angles to a torsion tube assembly. This assembly consists of a hollow torsional tube and an inner transmission shaft positioned within the torsion tube and affixed to the torsion tube at the end which joins the suspension arm. The other end of the torsion tube is fixed in position while the transmission shaft is free to rotate through the same arc as the suspension arm when the funnel moves. The transmission shaft turns through an arc against the restoring torque of the torque tube in accordance with the position of the funnel, which changes with the level of adsorbent in bottom zone 24. The transmission shaft, in turning opens and closes an air valve which controls the air pressure at pneumatically operated adsorbent valve 26. Thus, as the level of adsorbent rises, the funnel supports a greater weight causing the transmission shaft to turn thereby changing the air pressure at the adsorbent valve in such a manner as will cause the discharge from bottom zone 24 of larger quantities of adsorbent. This causes the adsorbent level to drop. In the manner hereinabove described, level control 58 controls the adsorbent level in bottom zone 24.

The gaseous mixture of hydrogen chloride and methane, wherein methane is the less readily adsorbable constituent and hydrogen chloride as the more readily adsorbable constituent, is withdrawn from separator 8 as previously described by means of line 35 controlled by valve 36. This gaseous mixture is combined with a recycle gas, as hereinafter more fully described, flowing through line 37 to form a combined feed which is introduced by means of line 38 into feed gas engaging zone 17. The combined feed thus introduced moves upwardly through adsorption zone 16 countercurrent to the downwardly flowing adsorbent and the hydrogen chloride, being the more readily adsorbable constituent of the combined feed, is adsorbed on the adsorbent together with a small amount of methane to form a rich adsorbent. A lean gas consisting essentially of methane as a substantially unadsorbed gas is formed simultaneously. The methane flows upwardly through adsorption zone 16 as a lean gas and a portion of the lean gas is disengaged from the adsorbent bed by means of lean gas disengaging zone 15 and is removed from selective adsorption column 10 by means of line 39 controlled by valve 40. The thus withdrawn lean gas is introduced by means of line 41 into separator 42 wherein traces of suspended adsorbent fines in the lean gas are separated. The separated fines are removed from separator 42 by means of line 43 controlled by valve 44. The lean gas, consisting essentially of pure methane, is removed from separator 42 by means of line 45, combined with fresh methane feed, and is introduced into chlorinator 5 as previously described.

The rich adsorbent formed, as previously described, in adsorption zone 16 flows downwardly through feed gas engaging zone 17 into primary rectification zone 18. The selective adsorption column has been provided with a side cut disengaging zone 19 which permits the production of a side cut gas which contains constituents present in the gaseous mixture being separated having an intermediate adsorbability. In cases in which the gaseous mixture consists predominantly of two constituents, for example, hydrogen chloride and methane, valve 46 which is shown in line 47 may be completely closed causing primary rectification zone 18 and secondary rectification zone 20 to function as a single rectification zone.

The rich charcoal introduced into the rectification zones 18 and 20 as previously described is contacted therein with an internal reflux gas containing a high concentration of hydrogen chloride as the more readily adsorbable constituent and a preferential desorption occurs which causes the desorption of the small amount of adsorbed methane from the rich adsorbent resulting in the formation of a rectified adsorbent which is substantially saturated with hydrogen chloride. This internal reflux gas comprises a portion of the rich gas withdrawn from rich gas disengaging zone 21 as hereinafter more fully described.

The rectified adsorbent formed in rectification zones 18 and 20 flows downwardly through rich gas disengaging zone 21 into heating and desorption zone 22. Heating and desorption zone 22 comprises a series of vertical tubes so disposed that the rectified adsorbent may flow downwardly therethrough and the adsorbent thus subjected to indirect heating by the circulation of flue gases generated in burners 48 and 49. Indirect heating may be applied by methods other than circulating flue gases such as condensing high pressure steam, oils, or other organic compounds such as diphenyl or diphenyl oxide or mixtures thereof on the outside of the tubes of heating and desorption zone 22.

The rectified adsorbent flowing downwardly through heating and desorption zone 22 is thus subjected to indirect heating so as to increase the temperature of the adsorbent to a value between about 300 and about 800° F. The amount of constituents adsorbable on a given adsorbent at high temperatures is considerably less than the amount adsorbable at lower temperatures and thus a thermal desorption of hydrogen chloride occurs. The amount of hydrogen chloride thus desorbed at a given pressure depends upon the temperature to which the rectified adsorbent is heated. It is preferred to desorb the major portion of adsorbed hydrogen chloride in heating and desorption zone 22, however, low desorption zone temperature may be used and the major portion of adsorbed hydrogen chloride may be desorbed in auxiliary stripping zone 13 by using a high flow rate of the lean stripping gas. In cases where the flow rate of lean stripping gas is high, a portion of the lean gas may be removed from lean gas disengaging zone 15 and introduced directly into the lower portion of auxiliary stripping zone 13 by an engaging zone not shown. The thus desorbed hydrogen chloride passes upwardly through the tubes of heating and desorption zone 22 into rich gas disengaging zone 21. A portion of the desorbed hydrogen chloride moves upwardly through rich gas disengaging zone 21 into rectification zones 18 and 20 to form the internal rich gas reflux previously mentioned. The remaining portion of the rich gas, which consists predominantly of hydrogen chloride, is removed from rich gas disengaging zone 21 by means of line 50 controlled by valve 51. By controlling the opening or closing of valve 51 in accordance with a temperature break in the adsorbent bed present in secondary rectification zone 20, the amount of internal rich gas reflux returned to secondary rectification zone 20 may be controlled so as to insure the complete desorption of methane from the adsorbent and thus permit the production of a rich gas which contains virtually no methane. The temperature break previously mentioned occurs because of the fact that the adsorption of gases on adsorbents is exothermic and therefore the adsorption of more readily adsorbable constituents heats the adsorbent to a higher temperature than the adsorption of less readily adsorbable constituents. Thus in the adsorption column, the temperature of the adsorbent is indicative of the composition of the gases being adsorbed at that point. By controlling the amount of rich gas reflux returned to rectification zones 18 and 20 in accordance with an adsorbent temperature present within those zones, the desired rich gas product purity may be attained.

The rich gas removed from rich gas disengaging zone 21 by means of line 50 controlled by valve 51, is introduced by means of line 52 into separator 53. Separator 53 functions in an analogous manner to separator 42 previously described to effect a substantially complete removal from the rich gas of suspended fine adsorbent granules. These fine granules settle to the lower portion of separator 53 and are removed therefrom by means of line 54 controlled by valve 55. The rich gas is removed from separator 53 by means of line 56 and is passed through rich gas cooler 57 wherein the rich gas is cooled. The rich gas product thus obtained consists of hydrogen chloride in substantially pure form.

The desorption of the major portion of adsorbed hydrogen chloride from the adsorbent may be effected in heating and desorption zone 22 in the complete absence of a stripping gas. The major portion of the adsorbed gas may be desorbed from the adsorbent by heating alone. The partially stripped adsorbent thus formed in desorption zone 22 when the rich gas is partially desorbed flows downwardly through adsorbent flow control zone 23 which effects an accurate metering action over the rate of flow of adsorbent flowing downwardly through selective adsorption zone 10. The partially stripped adsorbent is dropped into bottom zone 24 from whence it flows through sealing leg zone 25, through adsorbent flow control valve 26, through adsorbent transfer line 27, and is subsequently returned to the upper portion of the selective adsorption column. Sealing leg zone 25 comprises a vertical tube about 5 to 10 feet in length which reduces to a minimum the flow of desorbed rich gas downwardly through bottom zone 24, through sealing leg zone 25, transfer line 27 into lift line 28. Level controller 58 is provided to maintain a level of adsorbent in bottom zone 24 which extends downwardly through sealing leg zone 25 and which serves to actuate adsorbent flow control valve 26.

The partially stripped adsorbent removed from bottom zone 24 and conveyed as previously described, through lift line 28, impactless separator 31 and transfer line 32, flows downwardly into hopper zone 11 at a temperature approximating the temperature to which it was heated in heating and desorption zone 22. The hot partially stripped adsorbent flows downwardly from hopper zone 11, through recycle disengaging zone 12 into auxiliary stripping zone 13. A portion of the lean gas, formed as previously described in adsorption zone 16, flows upwardly through lean gas disengaging zone 15, through the tubes of cooling zone 14, and is introduced into the lower portion of auxiliary stripping zone 13 as a lean stripping gas. A portion of the lean stripping gas may be introduced directly into the lower portion of auxiliary stripping zone 13 by by-passing cooling zone 14 as previously described. The lean stripping gas passes upwardly through auxiliary stripping zone 13 countercurrent to the downwardly flowing partially stripped adsorbent. The presence of the lean stripping gas in contact with the partially stripped adsorbent containing adsorbed hydrogen chloride, reduces the partial pressure of hydrogen chloride present in the gas in equilibrium with the partially stripped adsorbent and causes a substantially complete desorption from the partially stripped adsorbent of the adsorbed quantities of hydrogen chloride. The recycle gas, containing hydrogen chloride and methane, continues upwardly through auxiliary stripping zone 13 and is disengaged from the adsorbent in recycle gas disengaging zone 12.

A quantity of the lift gas which is equal in proportion to the quantity of gas flowing downwardly through sealing leg 25 into lift line 28 flows downwardly through the partially stripped adsorbent present in hopper zone 11 and subsequently into recycle disengaging zone 12 wherein it is combined with the recycle gas previously described. This recycle gas is removed from recycle gas disengaging zone 12 by means of line 60 and is introduced into separator 61 wherein suspended adsorbent fines are removed. These adsorbent fines are removed from the lower portion of separator 61 by means of line 62 controlled by valve 63. The recycle gas, freed of adsorbent fines, is removed from separator 61 by means of line 64 and is introduced into recycle gas blower 65. Recycle gas blower 65 returns the recycle gas by means of line 37 controlled by valve 66 to be combined with the feed gas. The amount of stripping gas employed to remove the remaining portion of desorbed hydrogen chloride from the partially stripped adsorbent present in auxiliary stripping zone 13 is controlled by the rate at which recycle gas blower 65 withdraws recycle gas from rich gas disengaging zone 12. The amount of stripping gas required depends upon the pressure of operation, the composition of the feed gas, and the type of adsorbent and is controlled by flow controller 67 which serves to actuate valve 66.

While the foregoing description has been of an operation concerned with the separation of a gaseous mixture having but two constituents, namely, hydrogen chloride and methane, the process is equally effective in the separation of gaseous mixtures containing more than two constituents and in which more than two product gases are desired. In the above described separation the methane was obtained as a lean gas and hydrogen chloride was obtained as a rich gas. Under certain conditions of operation, gaseous mixtures containing hydrogen chloride which is deleteriously affected by the presence of water vapor, together with two or more other gaseous constituents, may be separated into three relatively pure fractions. Where the third constituent is of relatively intermediate adsorbability between methane and hydrogen chloride, it may be produced as a side cut gas and withdrawn from side cut gas disengaging zone 19 by means of line 47 controlled by valve 46. Again, as in the control of the flow rate of the rich gas product, temperature recorder controller 70 which is actuated by a temperature break in primary rectification zone 18 serves to open and close valve 46 so as to maintain the required amount of reflux in primary rectification zone 18 and the side cut gas product in the condition of high purity. A side cut gas product is introduced by means of line 71 into separator 72 from which separated adsorbent fines are withdrawn by means of line 73 controlled by valve 74. The side cut gas product is removed from separator 72 by means of line 75 and sent to storage or further processing not shown.

The process of separation of gaseous mixtures containing methane and hydrogen chloride may perhaps be best understood by reference to the following example:

*Example I*

A gaseous mixture consisting predominantly of methane and hydrogen chloride has the following composition:

| Constituent: | Volume per cent |
|---|---|
| Methane | 49.4 |
| Hydrogen chloride | 43.5 |
| Inert | 7.1 |
| | 100.0 |

It is desired to separate this gaseous mixture into its pure constituents so that the methane may be recirculated to a chlorination operation. The gaseous mixture is obtained at a flow rate of 3630 MSCF/D (1 MSCF/D is equal to 1000 standard cubic feet per day). It is appropriate to separate this gaseous mixture at a pressure of about 100 pounds per square inch gauge and the selective adsorption column necessary for such a separation is 7.0 feet in diameter and about 100 feet high. An adsorbent which is well suited to this separation comprises activated charcoal and a circulation rate of 54 tons of charcoal per hour is required. The inert constituents of the feed gas are less readily adsorbable than methane and consequently appear in the lean gas. The lean gas is produced at a rate of 2050 MSCF/D and has the following composition:

| Constituent: | Volume per cent |
|---|---|
| Inert | 12.6 |
| Methane | 86.7 |
| Hydrogen chloride | 0.7 |
| | 100.0 |

The rectified charcoal produced is heated in the heating and desorption zone previously described to a temperature of 550° F. at which temperature 77 volume per cent of the adsorbed hydrogen chloride present on the charcoal is desorbed and produced as a rich gas having the following composition:

| Constituent: | Volume per cent |
|---|---|
| Inert | |
| Methane | 0.9 |
| Hydrogen chloride | 99.1 |
| | 100.0 |

The roduction rate of the rich gas is 1580 MSCF/D.

A total of about 860 MSCF/D of lean gas is employed as a stripping gas in the auxiliary stripping zone above the cooling zone as previously described. This gas serves to desorb from the partially stripped charcoal the remaining 23% of hydrogen chloride which is not desorbed in the heating and adsorption zone. The recycle gas produced at a rate of 1550 MSCF/D is of the following composition:

| Constituent: | Volume per cent |
|---|---|
| Inert | 6.9 |
| Methane | 48.4 |
| Hydrogen chloride | 44.7 |
| | 100.0 |

The temperature of the partially stripped adsorbent introduced in the auxiliary stripping zone is between about 500° F. and 530° F. at which temperature a sufficient stripping of the remaining hydrogen chloride adsorbent is obtained without employing abnormal quantities of lean stripping gas.

In some instances it may be desirable to recirculate the lean gas containing methane for re-use in the process in which the hydrogen chloride is produced and in some cases the presence of 13% of inert material may be deleterious. Under such conditions the feed gas may be fed to a selective adsorption unit as described in connection with the accompanying drawing which is capable of fractionating a given gaseous feed mixture into three or more fractions. In this case the lean gas produced would consist of about 260 MSCF/D of the inert constituents and the side cut gas would consist of about 1800 MSCF/D of methane which would be recycled to the chlorination process. The rich gas product would consist of hydrogen chloride flowing at a rate of about 1570 MSCF/D.

Other modifications in the apparatus which I have previously proposed are applicable to the separation of gaseous mixtures which contain constituents like hydrogen chloride which preclude the use of steam as the stripping agent. For example, I have proposed a selective adsorption process which includes an apparatus provided with a multiplicity of adsorption zones and which is particularly adapted to gaseous mixtures containing relatively small amounts of the more readily adsorbable constituents. For gaseous mixtures in which the concentration of hydrogen chloride is, for example, less than about 20 to 25 volume per cent and the quantity of gas to be separated is rather large and of the order of 10,000 MSCF/D, considerable advantage may be shown in employing the multiple adsorption zone apparatus.

Although the entire foregoing description has been limited to a discussion of the separation of hydrogen chloride and methane, the process and apparatus is ideally suited to the separation of other hydrogen halides such as hydrogen bromide, hydrogen iodide, and hydrogen fluoride from gaseous mixtures containing these constituents. The process of my invention as herein disclosed is also applicable to the separation of gaseous mixtures containing constituents other than the hydrogen halides and which must for any reason be maintained in an anhydrous condition. Such gaseous mixtures may contain constituents such as sulfur dioxide, sulfur trioxide, chlorine, bromine, nitrogen dioxide and its dimer nitrogen tetroxide, hydrogen sulfide and others. Similarly, the adsorbent indicated in the example which comprises activated charcoal is only an example of adsorbents which are applicable to accomplish the process of my invention. Other adsorbents such as silica gel, activated bauxite, activated alumina, and the like, are applicable. However, activated carbon is preferred because of its high adsorption capacity.

The pressure of operation of the selective adsorption process herein described and indicated in the example as 100 pounds per square inch may be varied from pressures as low as atmospheric or slightly below to as high as 1000 pounds per square inch or more. It is more particularly adapted to superatmospheric pressure operation because of the fact that steam as a stripping agent is not employed. Superatmospheric pressures permit the circulation of smaller amounts of the adsorbent because the more readily adsorbable constituents are adsorbed to higher degrees at increased pressures. Furthermore, high pressure of operation is sometimes of advantage because of the fact that the gas to be separated is available at a high pressure and in a recirculatory process depressuring a gas product for separation and subsequently compressing the gas for reintroduction into the conversion process is uneconomical.

In some particular applications it is sometimes of advantage to employ a refrigerant other than the conventional cooling water in cooling zone 14. With decreasing temperature of lean adsorbent introduced into adsorption zone 16 increased amounts of gaseous constituents may be adsorbed on the adsorbent in that zone. At extremely high pressures of operation it may be of advantage to employ evaporating propane or ammonia or other refrigerant outside the tubes in cooling zone 14 to decrease the temperature of the adsorbent introduced into adsorption zone 16 a considerable degree below the temperature attained when cooling water is employed. Cooling the lean adsorbent by refrigeration to temperatures of between about 100° F. and —50° F. results in substantially the quantity of gases adsorbable by the adsorbent in adsorption zone 16.

The charcoal employed in the above process is preferably granular, about 10 to 14 mesh although granules as large as about 4 mesh and as small as about 100 or smaller may be employed in specific instances. The term charcoal used in the foregoing description is meant to include any animal, vegetable, or mineral carbon, the preferable form being an activated vegetable charcoal such as that prepared from coconut hulls or fruit pits.

A modification exists in the manner in which the granular adsorbent is conveyed from the bottom of the selective adsorber to the top thereof in which bucket elevators are applicable. In some instances such as for example at the lower pressures the use of elevators to transport the adsorbent are of advantage but in general the use of the gas lift system shown in the drawing described in the description thereof is to be preferred.

Having described and illustrated my invention and realizing that many modifications thereof will occur to those skilled in the art without departing from the spirit and scope of the following claims.

I claim:

1. A process for the continuous separation of a gaseous mixture by continuous selective adsorption on a solid granular adsorbent which comprises maintaining a continuous flow of a solid granular adsorbent downwardly by gravity through an auxiliary stripping zone, a cooling zone, an adsorption zone, and a heating zone successively, introducing said gaseous mixture into said adsorption zone so as to adsorb more readily adsorbable constituents of said gaseous mixture to form a rich adsorbent and a lean gas, removing a portion of said lean gas as a lean gas product from said adsorption zone, subjecting said rich adsorbent in said heating zone to indirect heating thereby desorbing from said rich adsorbent a portion of the constituents adsorbed thereon to form a rich gas and a hot partially stripped adsorbent, removing said rich gas as a rich gas product from said heating zone, conveying said hot partially stripped adsorbent upward from said heating zone to said auxiliary stripping zone, contacting said hot partially stripped adsorbent in said auxiliary stripping zone with the remaining portion of said lean gas formed in said adsorption zone to effect desorption of the additional constituents adsorbed thereon to form a lean adsorbent and a recycle gas, cooling said lean adsorbent in said cooling zone to form a cool lean adsorbent, and combining said recycle gas with said gaseous mixture to be separated.

2. A process for the continuous separation of gaseous mixtures of hydrogen chloride and methane by selective adsorption on a solid granular adsorbent which comprises maintaining a continuous flow of a solid granular adsorbent downwardly by gravity successively through an auxiliary stripping zone, a cooling zone, an adsorption zone, a rectification zone and a heating zone, combining said gaseous mixture with a recycle gas to form a combined feed, introducing said combined feed into said adsorption zone, contacting said combined feed therein with a moving bed of a solid granular adsorbent so as to substantially completely adsorb the hydrogen chloride together with a small amount of methane in said combined feed to form a rich adsorbent and a lean gas comprising methane, removing a portion of said lean gas from said adsorption zone as a lean gas product, contacting said rich adsorbent in said rectification zone with a rich gas reflux containing a high concentration of hydrogen chloride thereby desorbing from said rich adsorbent the adsorbed methane so as to form a rectified adsorbent, subjecting said rectified adsorbent to indirect heating in the absence of a stripping gas in said heating zone thereby desorbing from said rectified adsorbent the major proportion of hydrogen chloride adsorbed thereon so as to form a rich gas and a hot partially stripped adsorbent, employing a portion of said rich gas in said rectification zone as said rich gas reflux, removing the remaining portion of said rich gas from said heating zone as a rich gas product, conveying said hot partially stripped adsorbent from said heating zone to said auxiliary stripping zone, passing the remaining portion of said lean gas through said auxiliary stripping zone countercurrent to said hot partially stripped adsorbent thereby effecting a substantially complete desorption from said hot partially stripped adsorbent of the remaining portion of hydrogen chloride adsorbed thereon so as to form a hot lean adsorbent and said recycle gas, and cooling said hot lean adsorbent in said cooling zone.

3. In a process for the separation of gaseous mixtures of hydrogen halides and less readily adsorbable constituents which comprises maintaining a downward flow of a solid granular adsorbent by gravity through a cooling zone, an adsorption zone, a rectification zone and a heating zone, introducing said gaseous mixture into said adsorption zone to contact therein said downwardly moving bed of solid granular adsorbent so as to adsorb from said gaseous mixture a major portion of said hydrogen halides together with a small amount of said less readily adsorbable constituents to form a rich adsorbent and a lean gas comprising the less readily adsorbable constituents of said gaseous mixture, removing a portion of said lean gas from said adsorption zone as a lean gas product, contacting said rich adsorbent in said rectification zone with a rich gas reflux containing a high concentration of hydrogen halide so as to substantially completely desorb from said adsorbent the less readily adsorbable constituents adsorbed thereon to form a rectified adsorbent, subjecting said rectified adsorbent in said heating zone to indirect heating in the absence of a stripping gas so as to desorb the major portion of the hydrogen halide adsorbed thereon to form a rich gas and a partially stripped adsorbent, employing a portion of said rich gas as said rich gas reflux in said rectification zone, removing the remaining portion of said rich gas from said heating zone as a rich gas product, the improvement which comprises passing said hot partially stripped adsorbent through an auxiliary stripping zone, contacting therein said hot partially stripped adsorbent with the remaining portion of said lean gas countercurrently so as to effect substantially complete desorption of the remaining portion of hydrogen halide adsorbed thereon to form a recycle gas and a hot lean adsorbent, cooling said hot lean adsorbent in said cooling zone, and combining said recycle gas with said gaseous mixture to be separated.

4. In a process for the separation of a gaseous mixture of low molecular weight hydrocarbons containing a hydrogen halide precluding the use of steam as a stripping agent which comprises contacting said gaseous mixture in an adsorption zone with a moving bed of a solid granular adsorbent so as to form a lean gas containing said hydrocarbons and a rich adsorbent containing said hydrogen halide together with some of said hydrocarbons adsorbed thereon, contacting said rich adsorbent with a rich gas reflux containing hydrogen halide so as to desorb thereby from said rich adsorbent said hydrocarbons adsorbed thereon to form a rectified adsorbent, and desorbing said hydrogen halide from said rectified adsorbent to form a rich gas and a lean adsorbent, the improvement in hydrogen halide desorption which comprises subjecting said rectified adsorbent to indirect heating in a heating zone in the absence of a stripping gas to effect desorption of the major portion of hydrogen halide desorbed therefrom to form a rich gas and a hot partially stripped adsorbent, introducing said hot partially stripped adsorbent into an auxiliary stripping zone, employing a portion of said lean gas as a stripping gas to flow countercurrently to said hot partially stripped adsorbent therein to effect the desorption of the remaining portion of hydrogen halide adsorbed on said hot partially stripped adsorbent to form a recycle gas containing hydrogen halide and hydrocarbon and a lean adsorbent, and returning said recycle gas to said adsorption zone to be separated.

5. A process for the separation of gaseous mixtures according to claim 4 wherein said hydrogen halide comprises hydrogen chloride and said low molecular weight hydrocarbon comprises those hydrocarbon gases having less than about four carbon atoms per molecule.

6. A process for the separation of gaseous mixtures according to claim 4 wherein said rectified adsorbent is heated to a temperature between about 300° F. and about 800° F. in said heating zone.

7. A process for the continuous separation of gaseous mixtures containing at least one hydrogen halide together with less readily adsorbable constituents which comprises combining said gaseous mixture with a recycle gas to form a combined feed, introducing said combined feed into an adsorption zone, contacting said combined feed therein with a moving bed of a solid granular adsorbent thereby adsorbing from said gaseous mixture the hydrogen halide together with some of the less readily adsorbable constituents to form a rich adsorbent and a lean gas comprising said less readily adsorbable constituents, contacting said rich adsorbent in a rectification zone with a rich gas reflux containing said hydrogen halide thereby desorbing from said rich adsorbent the less readily adsorbable constituents adsorbed thereon so as to form a rectified adsorbent, subjecting said rectified adsorbent to indirect heating in a heating zone in the absence of water vapor and a stripping gas thereby desorbing the major portion of hydrogen halide adsorbed on said rectified adsorbent so as to form a rich gas and a hot partially stripped adsorbent, employing a portion of said rich gas as said rich gas reflux in said rectification zone, removing the remaining portion of said rich gas as a rich gas product, introducing said hot partially stripped adsorbent into said auxiliary stripping zone, and employing a portion of said lean gas as a stripping gas in said auxiliary stripping zone to contact said hot partially stripped absorbent therein so as to desorb therefrom the remaining portion of adsorbed hydrogen halide thereby forming a lean adsorbent and a recycle gas containing desorbed hydrogen halide together with the less readily adsorbable constituents present in said lean gas.

8. A process according to claim 7 wherein said solid granular adsorbent is selected from the class consisting of activated carbon, activated alumina, activated bauxite and silica gel.

9. A process according to claim 7 wherein said hydrogen halide is selected from the class consisting of hydrogen fluoride, hydrogen chloride, hydrogen bromide, and hydrogen iodide.

10. A process for the separation of normally gaseous mixtures containing hydrogen chloride and low molecular weight hydrocarbon gases which comprises maintaining a continuous flow of a solid granular adsorbent downwardly by gravity successively through an auxiliary stripping zone, a cooling zone, an adsorption zone, at least one rectification zone, and a heating zone which comprises combining said gaseous mixture with a recycle gas to form a combined feed, introducing said combined feed into an adsorption zone, contacting said combined feed therein with a moving bed of a solid granular adsorbent thereby adsorbing from said gaseous mixture the hydrogen chloride together with some low molecular weight hydrocarbon gas to form a rich adsorbent and a lean gas comprising said low molecular weight hydrocarbon gases, contacting said rich adsorbent in a rectification zone with a rich gas reflux containing said hydrogen chloride thereby desorbing said low molecular weight hydrocarbon gases adsorbed thereon so as to form a rectified adsorbent, subjecting said rectified adsorbent to indirect heat in a heating zone in the absence of water vapor and a stripping gas thereby desorbing the major portion of hydrogen chloride adsorbed on said rectified adsorbent so as to form a rich gas and a hot partially stripped adsorbent, employing a portion of said rich gas as said rich gas reflux in said rectification zone, removing the remaining portion of said rich gas as a rich gas product, introducing said hot partially stripped adsorbent into said auxiliary stripping zone, and employing a portion of said lean gas as a stripping gas in said auxiliary stripping zone so as to contact said hot partially stripped adsorbent therein to desorb from said hot partially stripped adsorbent the remaining portion of hydrogen chloride adsorbed thereon and thus forming a lean adsorbent and a recycle gas containing desorbed hydrogen chloride together with the low molecular weight hydrocarbon gases present in said lean gas.

11. A process according to claim 10 wherein said solid granular adsorbent comprises activated charcoal.

12. An apparatus for the continuous separation of gaseous mixtures containing constituents which must remain anhydrous which comprises a vertical adsorption column provided at successively lower levels with an auxiliary stripping zone, a cooling zone, an adsorption zone, a rectification zone, and a heating zone, means for maintaining a continuous flow of a solid granular adsorbent downwardly through said zones by gravity, means for introducing said gaseous mixture, means for removing fractions of said gaseous mixture from said adsorption column, and means for introducing at least a portion of one of said fractions into said auxiliary stripping zone as a stripping gas.

13. In an apparatus for the continuous separation of gaseous mixtures which must remain anhydrous which comprises a vertical selective adsorption column provided at successively lower levels with a cooling zone, an adsorption zone, at least one rectification zone, and a heating zone, means for removing adsorbent from the lower portion of said column, means for conveying the thus removed adsorbent from the bottom to the top of said column, means for introducing said adsorbent into the upper portion of said column to flow downwardly by gravity therethrough, means for introducing said gaseous mixture into said adsorption zone, means for removing a lean gas product, a side cut gas product and a rich gas product from said adsorption zone, said rectification zone and said heating zone, respectively, in said adsorption column, the improvement which comprises an auxiliary stripping zone above said cooling zone so disposed that the adsorbent removed from the lower portion of said adsorption column and conveyed to the upper portion of said adsorption column passes downwardly through said auxiliary stripping zone at an elevated temperature, means for passing a portion of one of said gaseous products upwardly through said auxiliary stripping zone countercurrent to the downwardly flowing adsorbent, means for removing a recycle gas from said auxiliary stripping zone, and means for returning said recycle gas to said adsorption zone.

14. An apparatus for the continuous separation of gaseous mixtures which contain constituents of varying degrees of adsorbability and which must be kept anhydrous which comprises a vertical adsorption column provided at successively lower levels with an auxiliary stripping zone, a cooling zone, at least one rectification zone, and a heating zone, means for maintaining a continuous flow of a solid granular adsorbent downwardly by gravity through said adsorption column, means for combining said gaseous mixture with a recycle gas to form a combined feed, means for introducing said combined feed into said adsorption zone to contact said downwardly moving adsorbent therein to adsorb the more readily adsorbable constituents together with some of the less readily adsorbable constituents present in said combined feed thereby forming a rich adsorbent and a lean gas containing less readily adsorbable constituents, means for introducing a rich gas reflux into said rectification zone thereby desorbing from said rich adsorbent the less readily adsorbable constituents adsorbed thereon so as to form a rectified adsorbent, means in said heating zone for subjecting said rectified adsorbent to indirect heating in the absence of water vapor and a stripping gas so as to desorb the major portion of said more readily adsorbable constituents from said rectified adsorbent to form a rich gas and a hot partially stripped adsorbent, means for removing a portion of said rich gas from said heating zone as a rich gas product, means for employing the remaining portion of said rich gas as said rich gas reflux, means for conveying said hot partially stripped adsorbent from said heating zone to said auxiliary stripping zone, means for introducing a portion of said lean gas into said auxiliary stripping zone to pass therethrough countercurrent to said hot partially stripped adsorbent in the absence of indirect heating to form a recycle gas containing less readily adsorbable constituents of said lean gas together with more readily adsorbable constituents therein desorbed from said hot partially stripped adsorbent and a hot lean adsorbent, means for removing said recycle gas from said auxiliary stripping zone, means for returning said recycle gas to said adsorption zone, means for subjecting said hot lean adsorbent to indirect cooling in said cooling zone, and means for returning the thus cooled lean adsorbent to said adsorption zone.

15. An apparatus according to claim 14 wherein said cooling zone is adapted to cool said hot lean adsorbent to temperatures between about 100° F. and —50° F.

16. An apparatus according to claim 14 wherein said heating zone is adapted to heat said partially stripped adsorbent to a temperature between about 300° F. and 800° F.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,702,311 | Pantenburg | Feb. 19, 1929 |
| 1,725,925 | Kent | Aug. 27, 1929 |
| 1,784,536 | Pantenburg | Dec. 9, 1930 |
| 1,825,707 | Wagner, Jr. | Oct. 6, 1931 |
| 2,119,091 | Atkinson et al. | May 31, 1938 |
| 2,300,235 | Pines et al. | Oct. 27, 1942 |
| 2,374,819 | Kanhofer et al. | May 1, 1945 |
| 2,384,311 | Kearby | Sept. 4, 1945 |

OTHER REFERENCES

"Chemical Process Principles," Hougen and Watson, vol. I, John Wiley and Sons, N. Y. Pages 182–183.